Oct. 8, 1940.　　　V. D. CANFIELD　　　2,216,936
HAND-OPERATED FOOD CHOPPER
Filed May 19, 1939
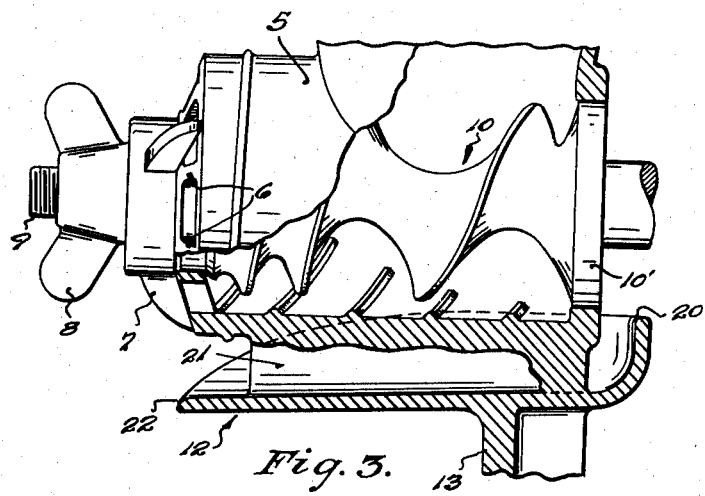
Fig. 3.
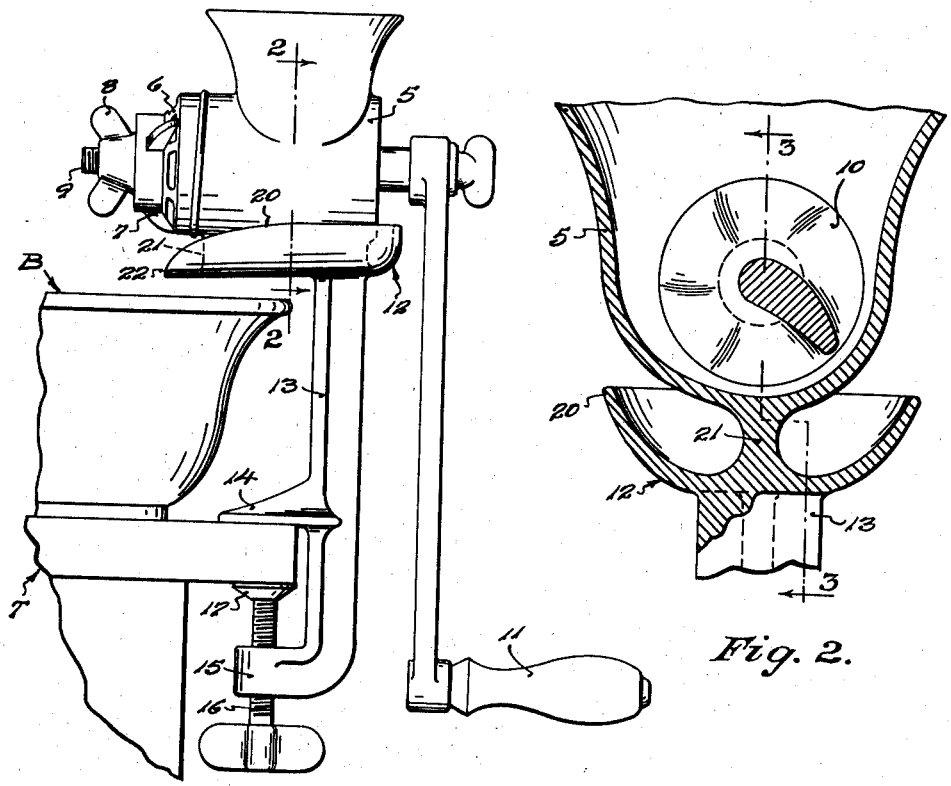
Fig. 1.
Fig. 2.
INVENTOR.
V. D. Canfield
BY
ATTORNEYS Patented Oct. 8, 1940

2,216,936

UNITED STATES PATENT OFFICE 2,216,936

HAND-OPERATED FOOD CHOPPER

Virgil David Canfield, Vashon, Wash.

Application May 19, 1939, Serial No. 274,556

1 Claim. (Cl. 146—188)

This invention relates to improvements in that character of machine commonly known as a food chopper, which is to say a machine employing a conveyor worm in association with a stationary shear-blade and a movable cutter knife, the cutter being detachably carried on a mandrel formed as a prolongation of the worm shaft. It may be here stated, in the conservatively priced hand-powered chopper produced for home use and to which the present invention pertains, that by far the most efficient machine is that in which the shear-blade is formed as an integral part of the machine casing, an arrangement, however, which requires a large opening in the rear wall of the casing to permit the worm to be withdrawn through the same for cleaning. The objection to this large opening and, to a lesser degree, to even the smaller openings in those types of hand-operated home choppers in which the rear opening accommodates the drive shaft only, is that juices squeezed from the food in their pressure-feed to the cutter knife are extruded rearwardly and, running down the machine standard and onto the supporting table, cause an unsightly condition and one which, by penetrating the pores of the rough-cast standards, corrode the metal. It will of course be further apparent that these juices are high in vitamin content and from the standpoint of promoting the consumer's health as well as to eliminate waste should be retained for use.

The principal objects of the present invention are to provide, in a machine of the class described, a drip-gutter operating to trap the extruded juices and carry the same to a receiving bowl therefor, to provide a drip-gutter of simplified construction and one so engineered into the machine as an integral part of the same as not to increase the production cost of the machine, and to provide a drip-gutter which in design permits the same to be most efficiently and easily cleaned. Other and more particular objects and advantages, with the foregoing, will become apparent in the course of the following detailed description and in the claims thereto annexed, the invention consisting in certain novel features of construction and in the arrangement and the combination of parts hereinafter described and claimed.

In the drawing:

Figure 1 is a side elevation of a food-chopping machine embodying a drip-gutter according to the present invention, the machine being shown applied to a supporting table and in operating relation to a receiving bowl.

Fig. 2 is a fragmentary vertical transverse section taken to an enlarged scale on line 2—2 of Fig. 1; and Fig. 3 is a fragmentary view taken partly in side elevation and partly in longitudinal vertical section on line 3—3 of Fig. 2.

In said drawing, the worm-casing of the machine, denoted by the numeral 5, is cylindrical in form and has an apertured forward wall produced somewhat in the nature of a spider with the radial arms 6 thereof acting as shear-blades for a rotary cutter 7 detachably secured by a wing-nut 8 to the projecting mandrel 9 of a worm 10, the worm being removed for cleaning through an opening in the rear wall of the casing. This opening acts as a bearing for a worm hub 10' and in diameter corresponds to the diameter or flight of the worm threads. 11 designates the handle or crank by means of which the worm and cutter are turned.

Subjacent to the worm-casing is a drip-gutter 12, hereinafter described more in detail, and this gutter, with the casing, is produced as a single casting on a standard 13. The standard is or may be sectionally of T-form and at its lower end has a pair of vertically spaced horizontal feet 14 and 15, the lower foot being threaded for the operation therein of a clamping screw 16 fitted with a swiveled follower 17 acting to clamp the standard to a table or other suitable support T.

Reverting to the gutter, it will be seen that I provide a relatively shallow vessel bordered along the sides and to the rear by a sloping wall 20 which preferably rises very slightly above the lower limits of the casing, the vessel projecting rearwardly beyond the rear limits of the casing and being transversely of a width approximating that of the casing. Dividing the vessel and serving as an elongated I-post for supporting the casing is a longitudinal rib 21, the drip-troughs which lie at each side of this rib being joined to the rear thereof by a cross-trough. For directing the trapped juices into a receiving bowl such as indicated by B the drip-troughs slope forwardly toward the open lip 22 and, to facilitate cleaning, are each transversely curved.

The invention is believed clear from the foregoing description of the now preferred embodiment, it being thought obvious that modifications might be resorted to without departing from the spirit of the invention.

What I claim, is:

In a food chopper employing a worm conveyor and a cylindrical casing for the worm having an opening in the rear wall of a diameter corresponding to the diameter or flight of the worm threads to permit the worm to be introduced to and removed from the casing through said opening, the combination with said casing, and with a supporting standard having means for clamping the same to a table edge, of a drip-gutter disposed subjacent to the casing in intervening relation between the casing and the standard and connected to the former by a relatively thin rib disposed on the longitudinal median line of the casing and functioning to divide the gutter into twin channels, said channels projecting rearwardly beyond the rear limits of the casing with a collective width approximating the width of the casing, the drip-gutter being open at the front and bordered along the sides and to the rear by an upstanding wall and having its floor inclined downwardly towards the open front for directing juices trapped by the gutter into a bowl placed under the chopper, said casing, the drip-gutter with its dividing rib, and the supporting standard being formed in a single casting, said casting being characterized in that the rib, considered in transverse vertical section, is of concavo-concave form merging with both the casing and the gutter channels on curves produced from radii of major length.

VIRGIL DAVID CANFIELD.